(12) United States Patent
Kregloh

(10) Patent No.: US 8,561,342 B2
(45) Date of Patent: Oct. 22, 2013

(54) SURF FISHING RIG

(71) Applicant: Kregloh IP Ventures, Inc., Solomons, MD (US)

(72) Inventor: Daniel J. Kregloh, Lusby, MD (US)

(73) Assignee: Kregloh IP Ventures, Inc., Solomons, MD (US)

( * ) Notice: Subject to any disclaimer, the term of this patent is extended or adjusted under 35 U.S.C. 154(b) by 0 days.

(21) Appl. No.: 13/729,423

(22) Filed: Dec. 28, 2012

(65) Prior Publication Data

US 2013/0118053 A1    May 16, 2013

Related U.S. Application Data

(63) Continuation of application No. 12/403,558, filed on Mar. 13, 2009, now Pat. No. 8,407,929.

(51) Int. Cl.
*A01K 91/00* (2006.01)

(52) U.S. Cl.
USPC .......................... 43/43.12; 43/44.83; 43/43.1

(58) Field of Classification Search
USPC ............... 43/43.12, 44.83, 43.1, 43.15, 42.74
See application file for complete search history.

(56) References Cited

U.S. PATENT DOCUMENTS

| 2,064,428 | A |   | 12/1936 | Hathaway |
|---|---|---|---|---|
| 2,559,537 | A |   | 7/1951 | Haynie |
| 2,790,265 | A |   | 4/1957 | Flynn, Sr. |
| 2,995,852 | A |   | 8/1961 | Kalman |
| 3,077,694 | A | * | 2/1963 | Cox ............................ 43/43.12 |
| 3,195,262 | A |   | 7/1965 | Metzler |
| 3,307,288 | A |   | 3/1967 | Spina |
| 3,341,966 | A | * | 9/1967 | Pippen ........................ 43/43.15 |
| 3,577,669 | A | * | 5/1971 | Johnson et al. .............. 43/43.11 |
| 3,878,636 | A |   | 4/1975 | George |
| 4,023,302 | A |   | 5/1977 | Hoaglin |
| 4,034,498 | A |   | 7/1977 | Ikarimoto |
| 4,380,131 | A |   | 4/1983 | Lazan, Jr. |
| 4,638,587 | A | * | 1/1987 | Koch ............................ 43/43.12 |
| 4,890,410 | A |   | 1/1990 | Pratscher et al. |
| 5,771,625 | A |   | 6/1998 | Savaglia |
| 2008/0060254 | A1 |   | 3/2008 | Bloomfield |

\* cited by examiner

*Primary Examiner* — Christopher P Ellis

(57) ABSTRACT

An apparatus provides a fishing rig designed for improved performance in bottom fishing applications such as surf fishing. This fishing rig includes a hoop attached to the top of a sinker. The rig line is attached at its bottom end to the hoop, and a hook-shaped member is attached to the rig line above the hoop. Above the hook-shaped member, one or more fish hooks are attached to the rig line, and a swivel is attached at the top end of the rig line.

19 Claims, 7 Drawing Sheets

SURF FISHING RIG

PRIORITY INFORMATION

The present application is a continuation of U.S. patent application Ser. No. 12/403,558, filed Mar. 13, 2009, the content of which is incorporated herein by reference in its entirety.

FIELD OF THE INVENTION

The present invention relates to a bottom fishing rig for use in connection with various types of cast fishing, such as surf fishing.

BACKGROUND OF THE INVENTION

Surf fishing is more readily accessible as a boat is not required. Surf fishing is accomplished along the surf at edge of the ocean such as on the beach. There are many different types of tackle and rigs that can be used for surf fishing. Generally, the tackle is larger than regular boat fishing or pier fishing tackle, and the rod is longer. The longer rod enables a longer cast past the break of the waves, and a larger reel is generally required to hurl the heavy tackle for a farther cast. The heaviest surf outfits are those used for casting bottom rigs with heavy pyramid sinkers past the break of the waves to reach deep pockets where larger fish may be swimming. Surf rods generally range from 8 feet to 12 feet or even longer.

Referring to FIG. 1, a common rig for surf fishing rig 100 includes a sinker 101 tied to the end of the line or leader 102 of the rig 100, and one or more fish hooks 103 spaced up the leader 102 within close proximity to the sinker 101. The fish hooks 103 float in the surf close to the bottom of the ocean. A swivel 104 is usually tied at the top of the leader above the fish hooks 103, and the swivel 104 connects the rig 100 to the rest of the fishing line from the rod and reel. The swivel 104 is a device typically consisting of two small rings 105 connected to a pivoting joint 106 between them. The swivel 104 prevents the line 102 from twisting when the bait twirls in the water or a hooked fish spins, and allows the line 102 to untwist while reeling it in. The swivel 104 turns at its pivoting joint 106, allowing the rig freedom to spin while keeping the line 102 from twisting.

As can be seen from FIG. 2, in order to cast, the rig must be of a length L that holds the sinker 101 above the ground, and thus the length L of the rig 100 is limited by the factors of the rod length and height of the person casting the rig. Accordingly, the hooks are located closer to the sinker, and thereby sit closer to the ocean bottom. The hooks proximity to the ocean bottom makes them susceptible to crabs, catfish, skate, and other scavengers stealing the bait and to snagging on objects on the ocean bottom.

Therefore, a need exists for a new and improved fishing rig that accommodates a longer leader while holding the sinker above the ground to enable casting.

SUMMARY OF THE INVENTION

In view of the foregoing disadvantages inherent in the known types of fishing rigs now present in the prior art, the present invention provides an improved fishing rig, and overcomes the above-mentioned disadvantages and drawbacks of the prior art. As such, the general purpose of the present invention, which will be described subsequently in greater detail, is to provide a new and improved fishing rig and method which has all the advantages of the prior art, as set forth above, and includes novel features. In that respect, the present invention results in a novel and non-obvious fishing rig that substantially departs from conventional rig designs of the prior art, and in doing so provides an apparatus for a fishing rig that permit a longer rig line while maintaining the sinker at a position above the ground to enable casting.

According to one embodiment of the invention, a fishing rig apparatus comprises a hoop attached to or proximate the top of a sinker. The rig line is attached at its bottom end to the hoop, and a hook-shaped member is attached to the rig line above the hoop. According to a further embodiment, this embodiment further comprises one or more fish hooks attached to the rig line above the hook-shaped member, and a swivel attached at the top end of the rig line.

According to another embodiment of the invention, a fishing rig apparatus comprises a rig line attached at its bottom end to a sinker, and a hook-shaped member attached to the rig line above the sinker, wherein the hook-shaped member comprises a plurality of hook-shaped protrusions shaped to cradle the sinker. According to a further embodiment, this embodiment further comprises one or more fish hooks attached to the rig line above the hook-shaped member, and a swivel attached at the top end of the rig line.

Other aspects and advantages of the invention are readily apparent from the following detailed description, illustrating a number of particular embodiments, including the best mode contemplated for carrying out the invention. The invention is also capable of further embodiments, and its details can be modified in various respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings, and in which like reference numerals refer to similar elements, and wherein.

DETAILED DESCRIPTION

An improved apparatus for a surf fishing rig is described. In the following description, for the purposes of explanation, numerous specific details are set forth in order to provide a thorough understanding of the present invention. It is apparent, however, to one skilled in the art that the present invention can be practiced without these specific details or with an equivalent arrangement.

Figure 3:
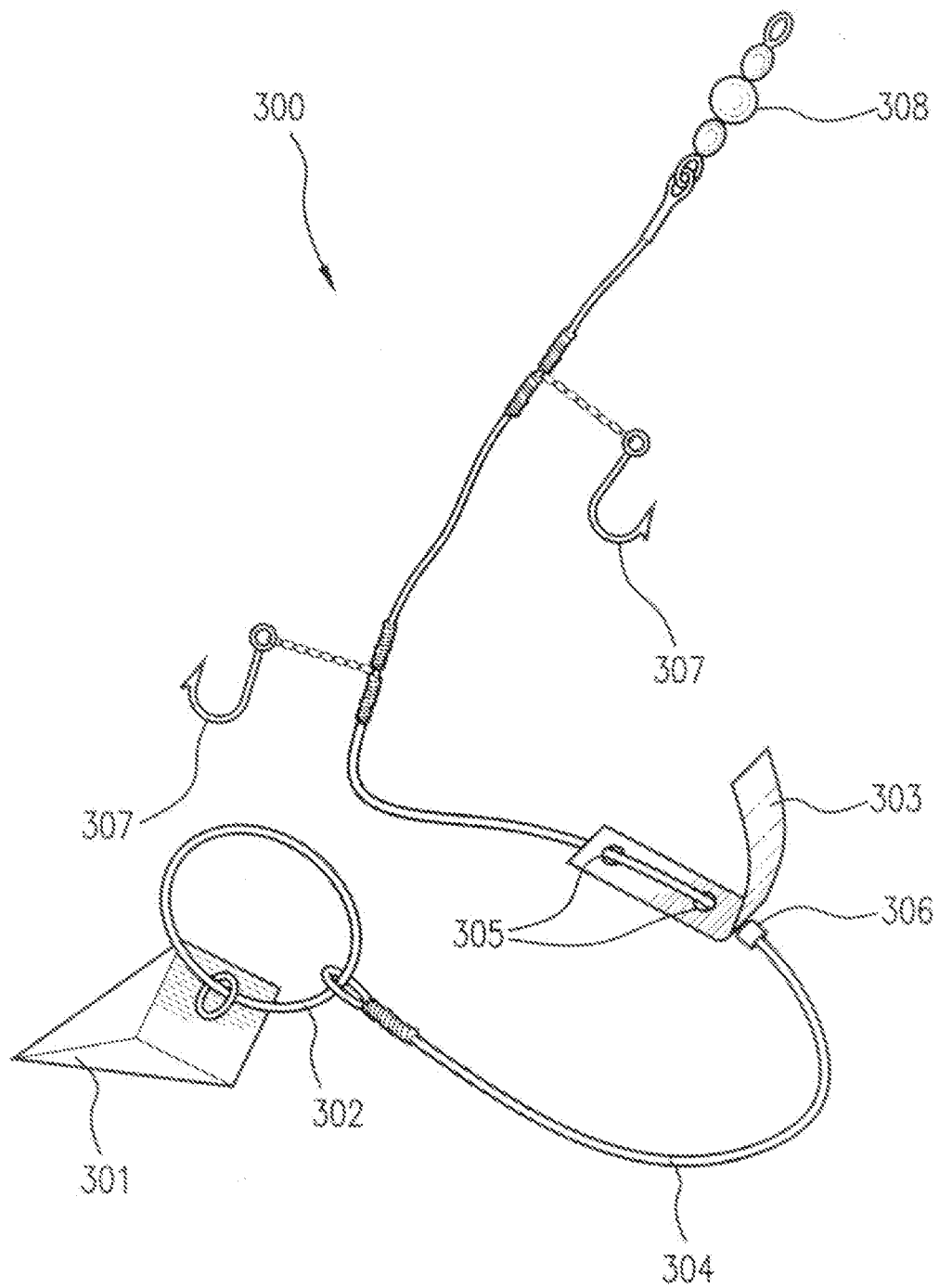
FIG. 3 is a diagram of a fishing rig in accordance with a first embodiment of the present invention.

FIG. 3 illustrates a surf fishing rig 300 in accordance with a first embodiment of the present invention. In this embodiment the sinker 301 is attached to the end of the rig line 304 via a hoop 302. Preferably, the sinker 301 has a weight of at least 1/16 ounce but not greater than 48 ounces. The hoop 302 may be of varying geometrical shapes, such as circular (as shown in FIG. 3), oval, rectangular and square. If circular, the hoop 302 may preferably have a diameter of from 1/16 inch to 36 inches. Alternatively, sinker 301 may be provided with any configuration of protrusion that may be removably connected to a hook-shaped member, as will not be described. Above the hook 302, at least one hook-shaped member 303 is provided. As shown, for example, in FIG. 3, hook-shaped member 303 may comprise any rigid or semi-rigid material, such as metal or the like. In a preferred embodiment, hook-shaped member 303 includes a first portion that is substantially contiguous with or parallel to rig line 304 and fixedly or slidably secured thereto, as described below, and a second portion that extends at an angle of between 0 degrees and 90 degrees from the first portion. The hook-shaped member 303 may, for example, be up to twelve inches in length and weigh from one gram to two kilograms.

The hook-shaped member 303 is attached to the rig line 304, for example, by means of the rig line 304 being weaved through two or more holes 305 in the hook-shaped member 303 with a clamping device 306 positioned below the hook shaped member 303 to hold it in place on the rig line 304. Alternatively, the hook-shaped member may be slidably attached to the rig line 304. In addition, one of skill in the art will recognize that other means may be employed for attaching the hook-shaped member 303 to the rig line 304 and for holding the hook-shaped member 303 in place on the rig line 304. For example, the hook-shaped member 303 may be integrated in-line with the rig line 304, as will be understood by those skilled in the art.

Above the hook-shaped member 303 one or more fish hooks 307 are spaced up the rig line 304, and a swivel 308 is attached at the top of the rig line 304 for attaching the rig 300 to the fishing line from the reel. Preferably, hook-shaped member 303 is positioned proximate the bottom hook 307 but spaced far enough therefrom to avoid entanglement with the bottom hook. More specifically, according to the present invention the distance between the hook-shaped member 303 and the sinker 301 is made as long as possible, while still enabling casts to be performed, because the longer the distance between the hook-shaped member 303 and sinker 301 the higher the hooks 307 will be positioned from the water bottom when the fishing rig of the present invention is in use. In this embodiment, the rig line 304 is of a length that is longer than rig line 102 lengths of the prior art, and preferably the length of the rig line 304 between the sinker 301 and the fish hooks 307 is longer than that of prior art rigs 100.

Figure 1:
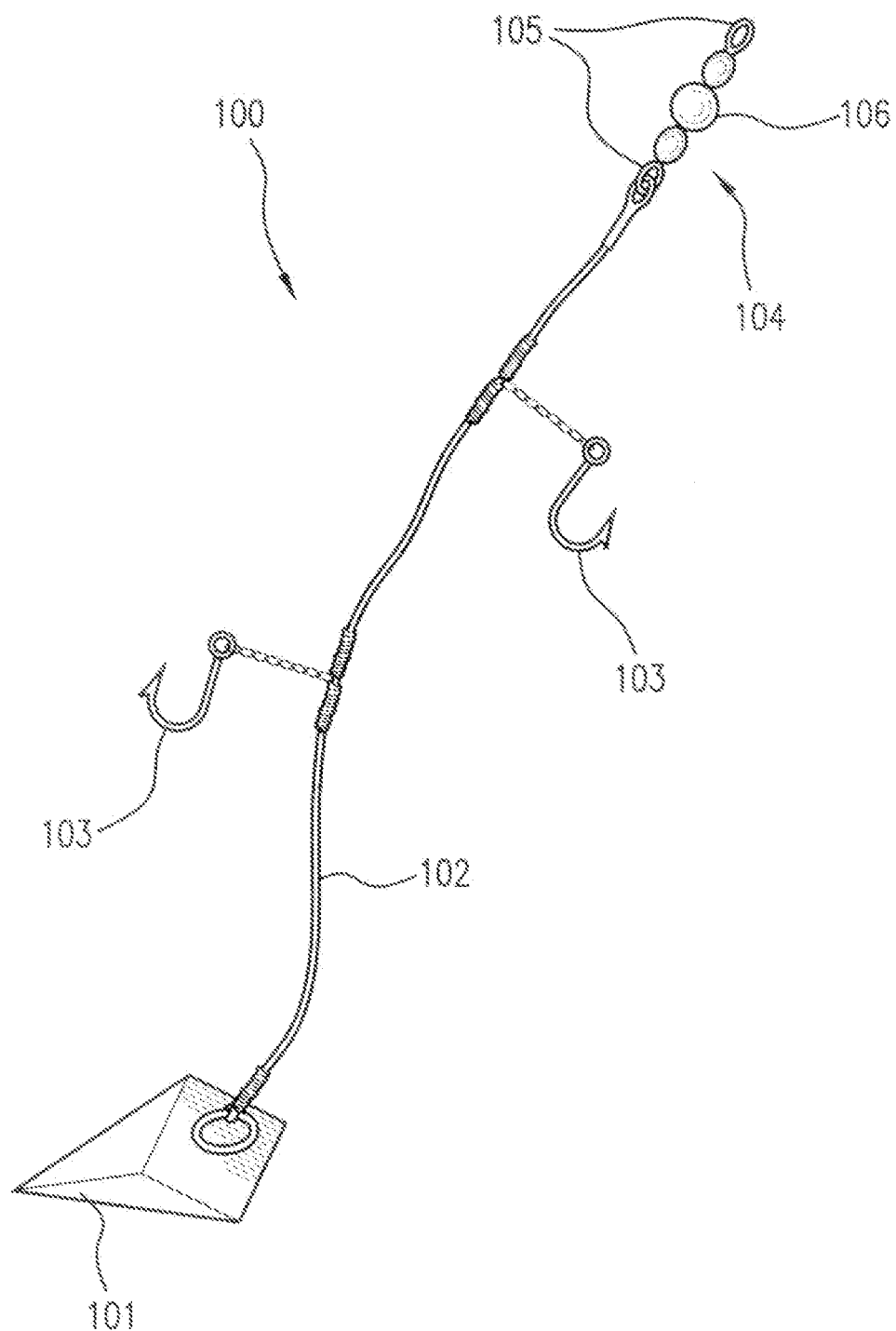
FIG. 1 is a diagram of a fishing rig of the prior art.
Figure 2:
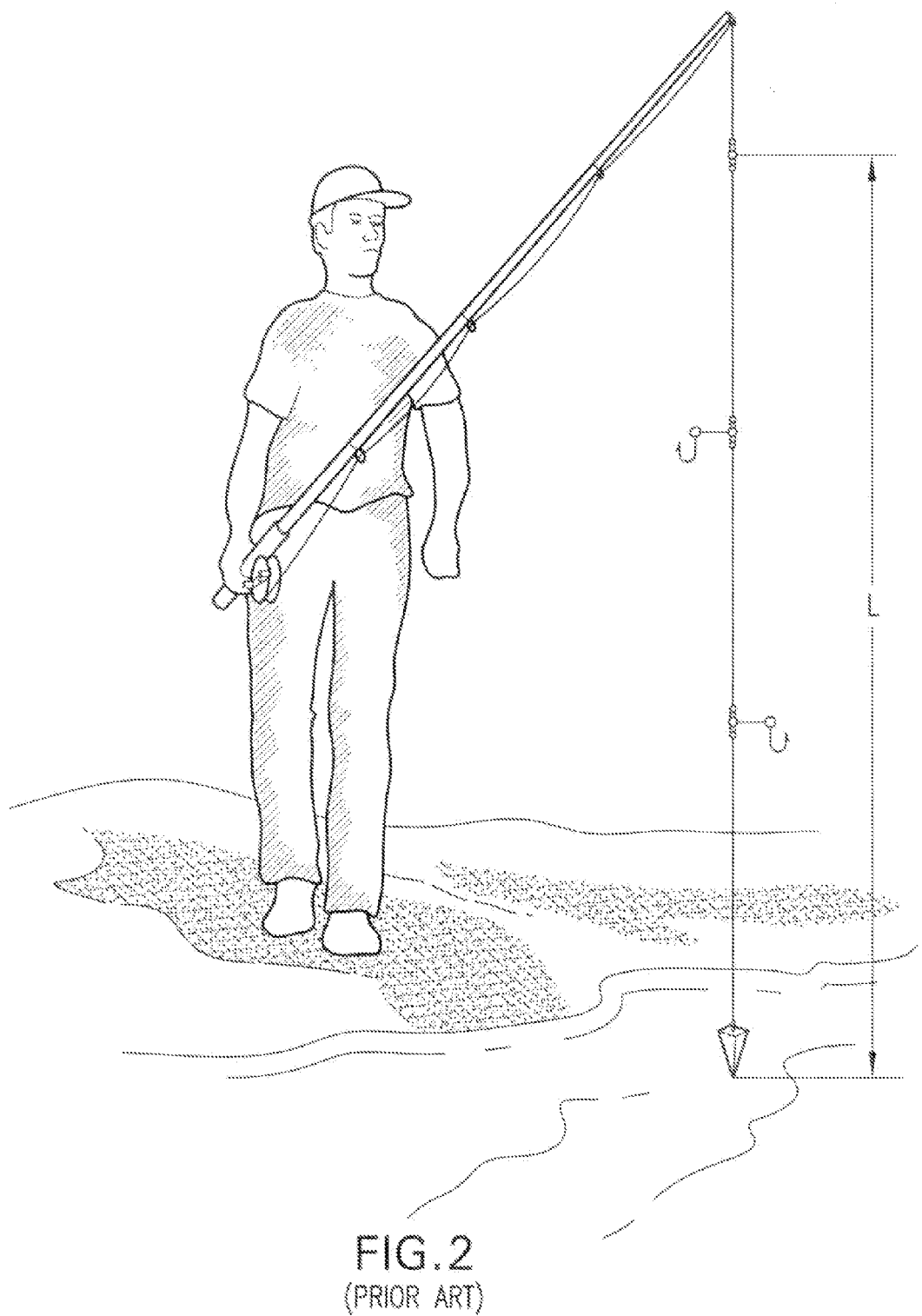
FIG. 2 is a diagram of a person casting the fishing rig of FIG. 1 into the surf.
Figure 4A:
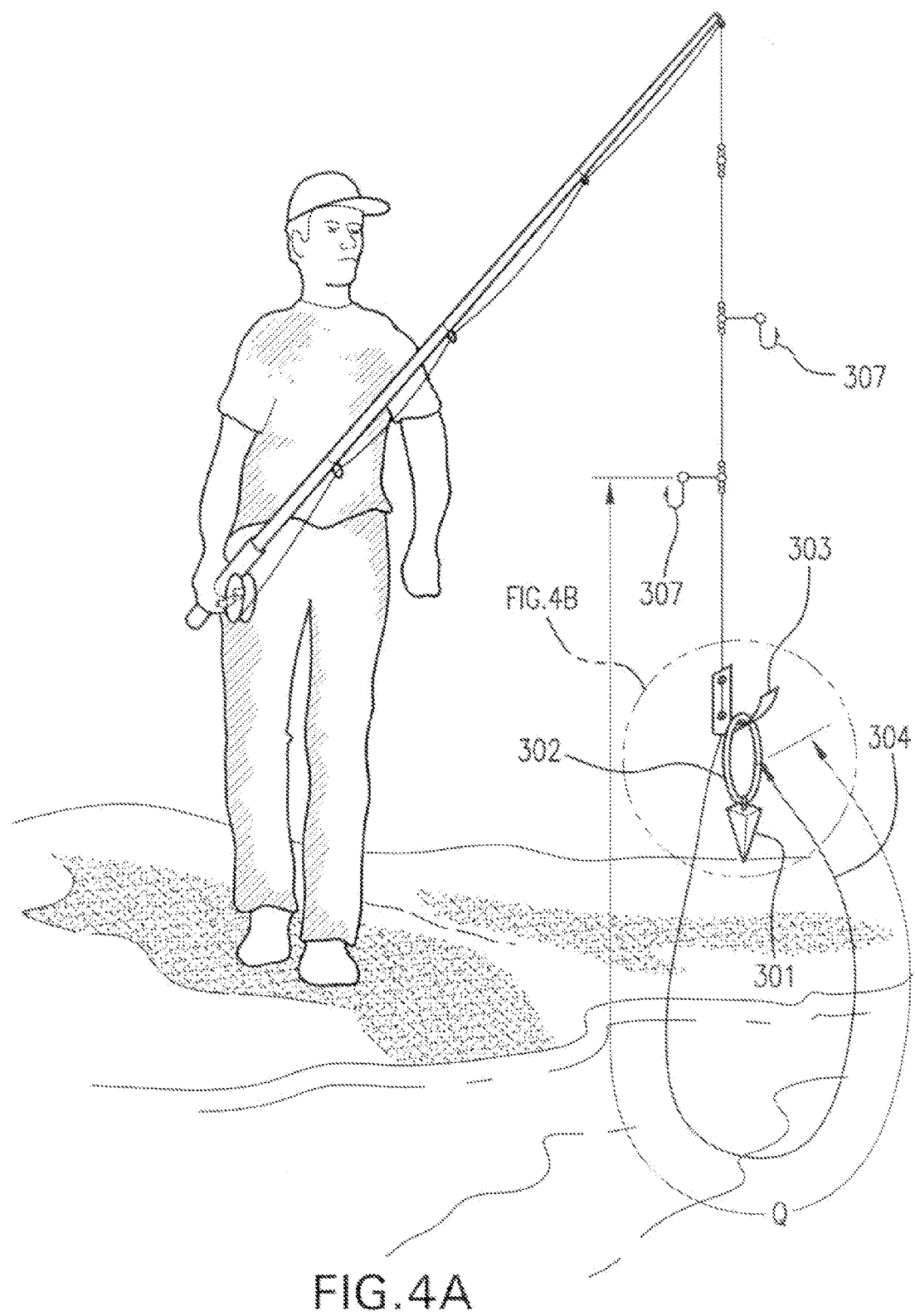
FIG. 4(a) is a diagram of a person casting the fishing rig of FIG. 3 into the surf.
Figure 4B:
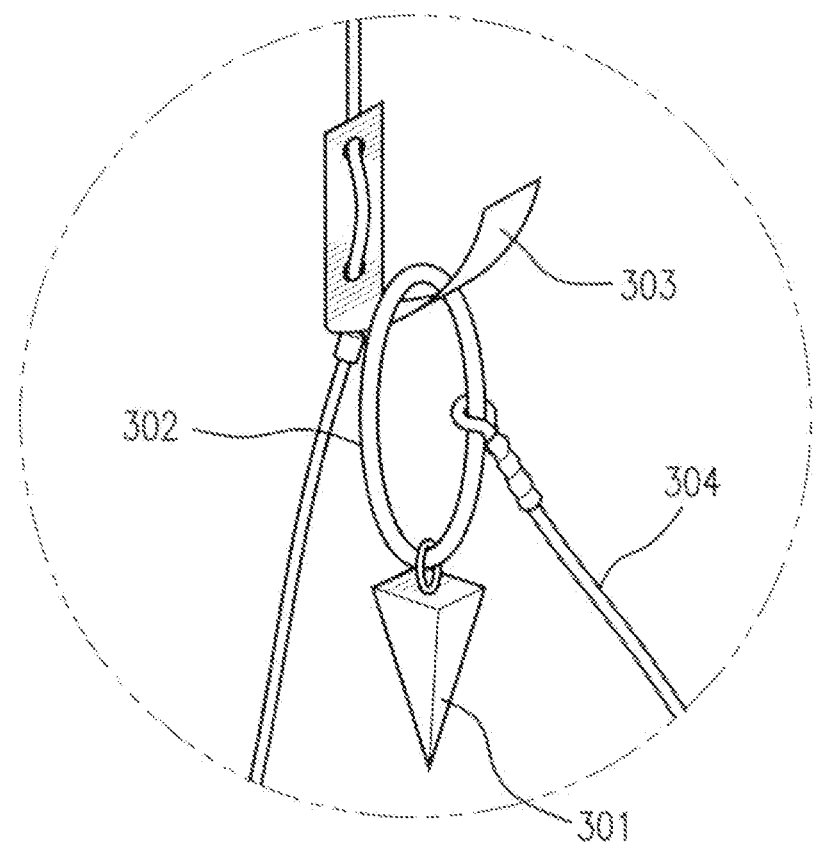
FIG. 4(b) is a close up of a portion of FIG. 4(a) showing the deployment of the fishing rig of FIG. 3.

Referring to FIG. 4, when casting, the hoop 302 at the top of the sinker 301 is hooked onto the hook-shaped member 303 such that hoop 302 rests at the intersection of the first and second portions of hook-shaped member 303, as described above. The sinker 301 is thereby held above the ground, which enables casting, despite the rig line 304 between the sinker 301 and the fish hooks 307 being of a length Q that is longer than the length L of the prior art rig 100 shown in FIG. 2. When the rig 300 is cast, the force of the cast as the angler brings the rod upward and/or forward toward his target dislodges the hoop 302 from the hook-shaped member 303. That is, as the angler performs the casting motion the weight of the sinker 301 initiates separation from the hook-shaped member 303. The separation of the sinker 301 from the hook-shaped member 303 allows the extension of the length Q of rig line 304 between the sinker 301 and the fish hooks 307. Accordingly, with the longer length Q of rig line 304 between the sinker 301 and the fish hooks 307, the fish hooks 307 float a further distance from the sinker 301 and above the water bottom, thus rendering them less susceptible to snagging, crabs, and other scavengers.

In the first embodiment of the present invention illustrated, for example, in FIG. 3, the invention has described as providing hook-shaped member 303 above hoop 302 (that is, hook shaped member 303 is positioned closer to the hooks 307 than is hoop 302), however, this does not have to be the case. Alternatively, the hook-shaped member 303 may be positioned at or proximate the sinker 301 and the hoop 302 may be fixedly or slidably attached to the rig line 304 at a position above the hook shaped member 303 without departing from the spirit or scope of the present invention.

Figure 5:
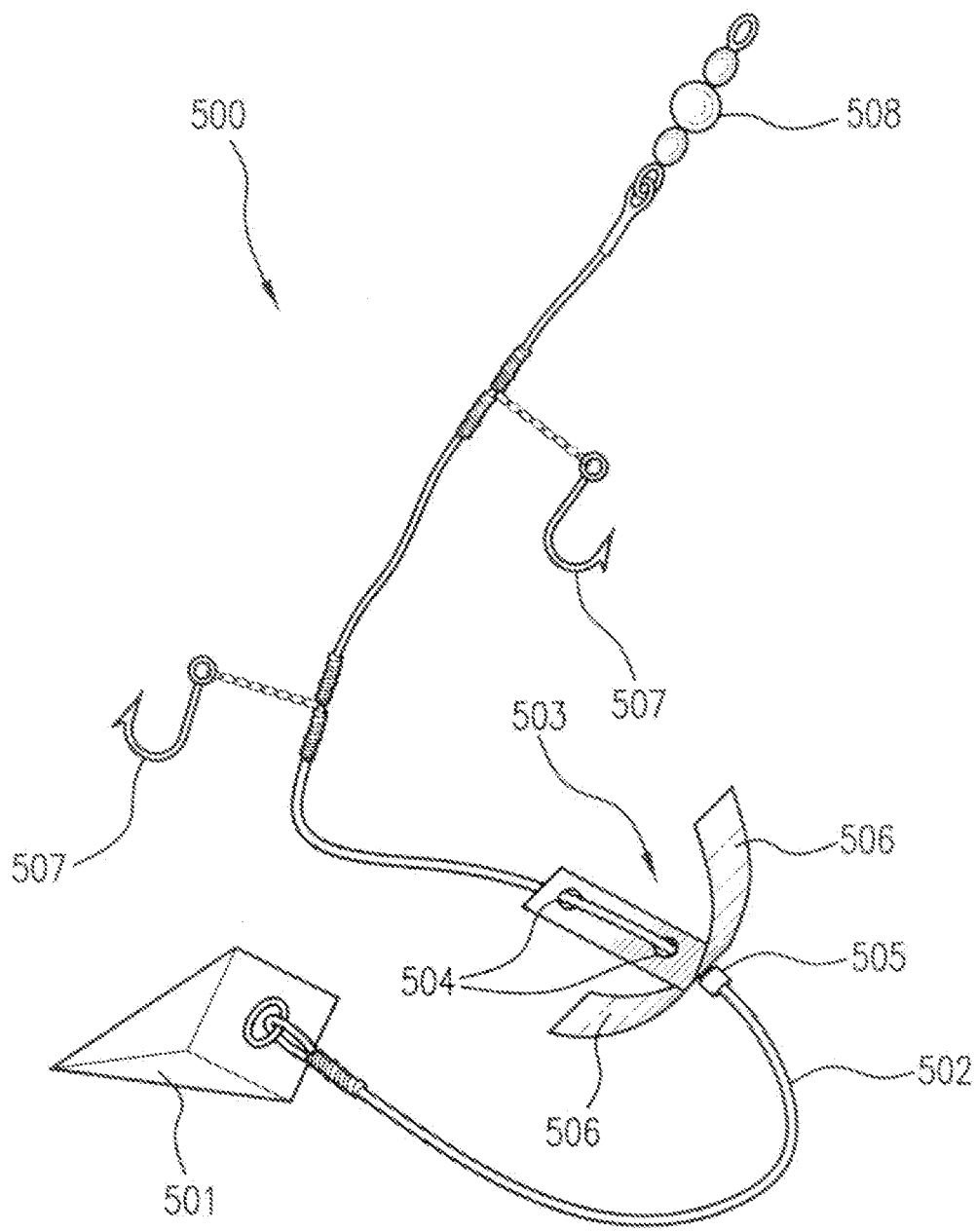
FIG. 5 is a diagram of a fishing rig in accordance with a second embodiment of the present invention.

FIG. 5 illustrates a surf fishing rig 500 in accordance with a second embodiment of the present invention. In this embodiment the sinker 501 is attached directly to the end of the rig line 502. Above the rig line 502 from the sinker 501, a hook-shaped member 503 is fixedly or slidably attached to the rig line 502 by means of the rig line 502 being weaved through holes 504 in the hook-shaped member 503 with a clamping device 505 positioned below the hook-shaped member 503 to hold it in place on the rig line 502. Again, one of skill in the art will recognize that other means may be employed for attaching the hook-shaped member 503 to the rig line 502 and for holding the hook-shaped member 503 in place on the rig line 502. In this embodiment, the hook-shaped member 503 in place on the rig line 502. In this embodiment, the hook-shaped member 503 comprises a plurality of hook-shaped protrusions 506 shaped to cradle the sinker 501. Above the hook-shaped member 503 one or more fish hooks 507 are spaced up the rig line 502, and a swivel 508 is attached at the top of the rig line 502 for attaching the rig to the fishing line from the reel. In this embodiment, as in the first embodiment, the rig line 502 is of a length that is longer than rig line 102 lengths of the prior art, and preferably the length of the rig line 502 between the sinker 501 and the fish hooks 507 is longer than that of prior art rigs 100.

Figure 6:
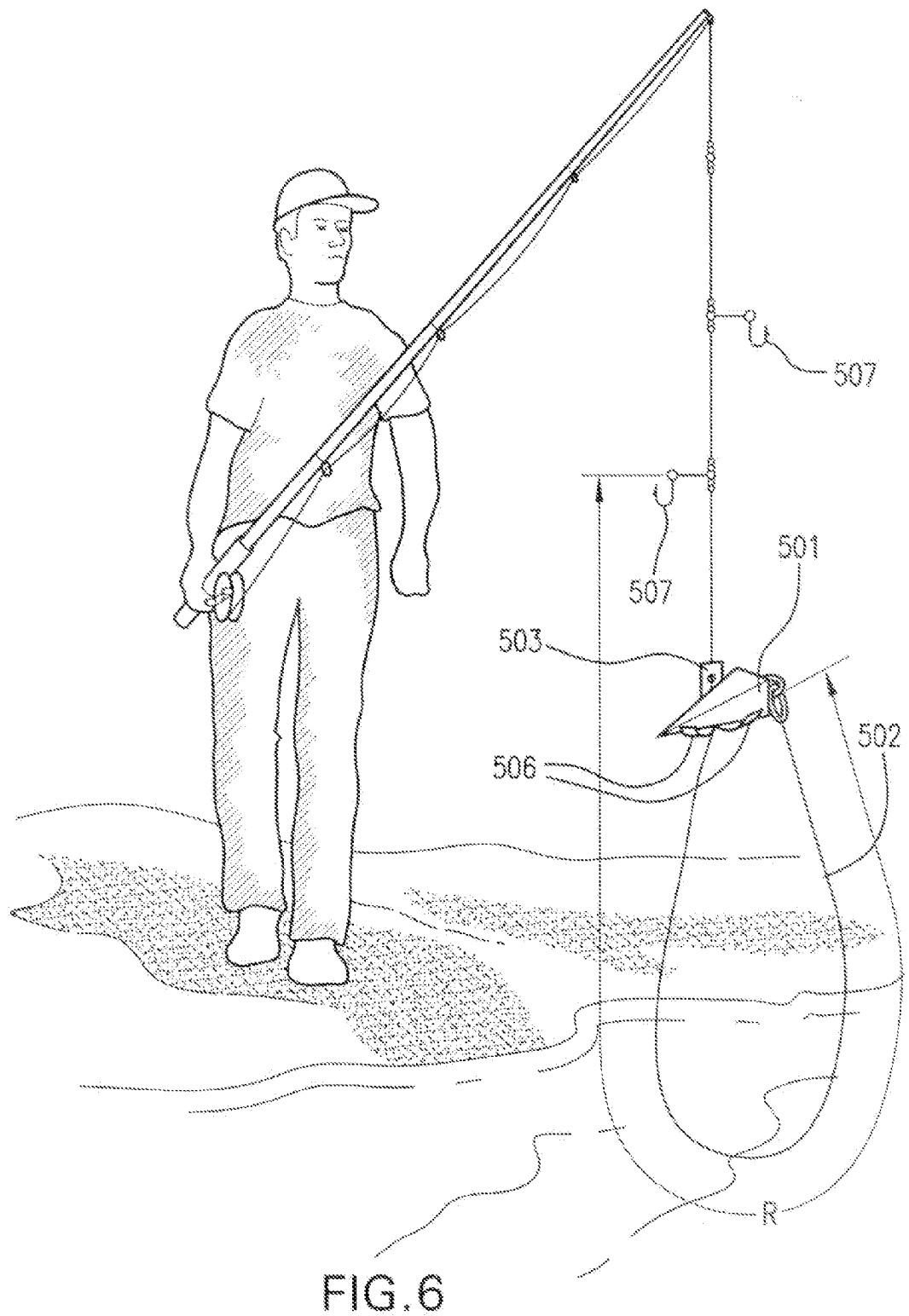
FIG. 6 is a diagram of a person casting the fishing rig of FIG. 5 into the surf.

Referring to FIG. 6, when casting, the sinker 501 is cradled in the plurality of hook-shaped protrusions 506 on the hook-shaped member 503, holding the sinker 501 at a higher position. As in the first embodiment, the sinker 501 is thereby held above the ground, which enables casting, despite the rig line 502 between the sinker 501 and the fish hooks 507 being of a length R that is longer than that of the prior art rigs 100. When the rig 500 is cast, the force of the cast as the angler brings the rod upward and/or forward toward his target dislodges the sinker 501 from the hook-shaped member 503. This frees the sinker 501 from the hook-shaped member 503, which allows the extension of the length R of the rig line 502 between the sinker 501 and the fish hooks 507. Similar to the first embodiment, with the longer length of rig line 502 between the sinker and the fish hooks 507, the fish hooks 507 float a further distance from the sinker 501 and the ocean bottom, rendering them less susceptible to snagging and crabs, etc.

In the first and second embodiments described above, the hook-shaped members 303 and 503 are located between the sinkers 301 and 501 and the fish hooks 307 and 507, respectively. In an alternate embodiment of the present invention, the hook-shaped members 303 and 503 of either of the first or second embodiments may be located above the fish hooks 307 and 507, respectively (between the fish hooks and the swivel). In yet a further embodiment, where the rig comprises more than one fish hook, the hook-shaped members 303 and 503 of either of the first or second embodiments may be located between any pair of the fish hooks 307 and 507. With an embodiment where the hook-shaped member 303 of the first embodiment is located at a different position on the rig 300, the method of surf fishing is performed in the same manner as with the first embodiment. That is, the hoop 302 at the top of the sinker 301 is hooked onto the hook-shaped member 303, and when the rig 300 is cast, the force of the cast dislodges the sinker 301 from the hook-shaped member 303. Similarly, with an embodiment where the hook-shaped member 503 of the second embodiment is located at a different position on the rig 500, the method of surf fishing is performed in the same manner as with the second embodiment. That is, the sinker 501 is cradled in the plurality of hook-shaped protrusions 506 of the hook-shaped member 503, and when the rig 500 is cast, the force of the cast dislodges the sinker 501 from the hook-shaped member 503.

As one skilled in the art will recognize, different positioning of the hook-shaped member permits the use of differing lengths of rig lines allowing flexibility in the location of the fish hooks with respect to the sinker at the end of the rig.

The embodiments of the invention described herein depict the use of pyramid sinkers. A pyramid sinker is in the shape on an inverted pyramid with a brass or other metal eye located on the bottom of the base of the pyramid for attaching the rig line. Pyramid sinkers are generally used primarily for surf fishing because they hold the bottom better than round sinkers. One of skill in the art, however, will recognize that various types of sinkers may be employed, such as a spider sinker, which comprises multiple heavy wire arms protruding from its side much like spider legs. These arms or legs are bent in a fashion that allows them to grab the bottom and hold steady in a current or surf condition. Likewise, the embodiments of the invention described herein depict the use of single-barb fish hooks, which comprise a single hook curve with a barb at the end. Here also, one of skill in the art will recognize that various types of fish hooks may be employed depending on the size and types of fish being sought.

The foregoing, therefore, is considered as illustrative only of the principles of the embodiments of the invention. While the invention has been described above through a number of embodiments and implementations, the invention is not so limited, but rather covers various modifications and equivalent arrangements that may be apparent to one of skill in the respective art, all falling within the scope of the invention and within the scope of the appended claims.

I claim:

1. A fishing rig, comprising:
a rig line, having a top end and a bottom end, the bottom end configured to attach to a sinker; and
a fastener having a first component attached to the sinker and a second component that is hook-shaped and attached to the rig line above the sinker and below a hook positioned below the top end of the rig line, the first component and the second component coupleable to make a loop in the rig line such that casting the rig line when the first component and the second component are coupled and with the top end of the rig line at a tip end of a casting rod causes the first component and the second component separate from each other.

2. The fishing rig of claim 1, further comprising:
a swivel attached to the rig line at the top end.

3. The fishing rig of claim 1, wherein the second component is attached to the rig line by the rig line being weaved through a hole in the second component.

4. The fishing rig of claim 1, wherein the rig line is attached to the sinker at the bottom end, and a hoop is attached to the rig line between the sinker and the second component at a position proximate to the sinker.

5. The fishing rig of claim 1, wherein the second component has a weight of at least one gram but not greater than two kilograms.

6. A fishing rig, comprising:
a rig line, having a top end and a bottom end, the bottom end configured to attach to a sinker; and
a fastener having a first component attached to the sinker and a second component attached to the rig line above the sinker and below a hook, wherein the first component and the second component are separate from each other, wherein the first component and the second component can temporarily couple one with another, wherein, a user casts the rig line with the first component and the second component coupled, the first component and the second component separate, and wherein the second is a hook-shaped member.

7. The fishing rig of claim 6, further comprising:
a swivel attached to the rig line at the top end.

8. The fishing rig of claim 7, further comprising:
a plurality of hooks attached to the rig line between the second component and the swivel.

9. The fishing rig of claim 6, wherein the second component is attached to the rig line by means of the rig line being weaved through one or more holes in the second component.

10. The fishing rig of claim 1, wherein the hook is a bottom-most hook.

11. The fishing rig of claim 1, wherein the second component has a smooth surface that is a single member and substantially free of loops and twists.

12. A fishing rig comprising:
a rig having a sinker attached to a bottom end of the rig line; and
a fastener comprising a first component and a second component that are temporarily coupled to make a loop in the rig line,
such that when casting the rig line, the first component and the second component separate from each other on the top half of a casting arc, wherein the second component is attached to the rig line above the sinker and below a hook, the hook being below a top end of the rig line.

13. The fishing rig of claim 12, wherein the first component is attached to the sinker.

14. The fishing rig of claim 12, wherein the second component is attached to the rig line above the sinker and below the hook.

15. The fishing rig of claim 12, wherein the second component is a hook-shaped member.

16. The fishing rig of claim 12, wherein the second component has a smooth surface that is substantially free of loops and twists.

17. The fishing rig of claim 16, wherein the second component is substantially free of holes.

18. The fishing rig of claim 12, wherein the hook is a bottom-most hook.

19. The fishing rig of claim 12, wherein when casting the rig line and when the first component and the second component separate from each other, the loop is generally made straight.

* * * * *

UNITED STATES PATENT AND TRADEMARK OFFICE
CERTIFICATE OF CORRECTION

| | | |
|---|---|---|
| PATENT NO. | : 8,561,342 B2 | Page 1 of 1 |
| APPLICATION NO. | : 13/729423 | |
| DATED | : October 22, 2013 | |
| INVENTOR(S) | : Daniel J. Kregloh | |

It is certified that error appears in the above-identified patent and that said Letters Patent is hereby corrected as shown below:

In the Specification

Column 3, line 7, "hook 302," should read --hoop 302,--.

Signed and Sealed this
Twenty-fourth Day of December, 2013

Margaret A. Focarino
*Commissioner for Patents of the United States Patent and Trademark Office*